United States Patent [19]

Gloria et al.

[11] 4,403,887

[45] Sep. 13, 1983

[54] METHOD OF COVERING THE SUMP OF UNDERGROUND CAVITIES

[75] Inventors: Karl Gloria, Hattingen; Alexander-Barbu Costinescu-Tataranu, Essen; Wilhelm Schuster; Jürgen Wittekind, both of Frankfurt am Main, all of Fed. Rep. of Germany

[73] Assignee: Ruhrgas Aktiengesellschaft, Essen, Fed. Rep. of Germany

[21] Appl. No.: 269,736

[22] Filed: Jun. 2, 1981

[30] Foreign Application Priority Data

Jun. 4, 1980 [DE] Fed. Rep. of Germany ....... 3021064

[51] Int. Cl.$^3$ ............................................. B65G 5/00
[52] U.S. Cl. ......................................... 405/53; 405/59
[58] Field of Search ....................... 405/53, 55, 57, 59, 405/210; 422/43

[56] References Cited

U.S. PATENT DOCUMENTS

| 3,095,263 | 6/1963 | Eckert et al. | 422/43 |
| 3,745,770 | 7/1973 | Fraser et al. | 405/59 |
| 4,147,658 | 4/1979 | Savoit et al. | 422/43 X |
| 4,209,271 | 6/1980 | McCabe et al. | 405/210 |

FOREIGN PATENT DOCUMENTS

| 2416591 | 4/1974 | Fed. Rep. of Germany . |
| 2346740 | 3/1975 | Fed. Rep. of Germany . |
| 2539720 | 3/1977 | Fed. Rep. of Germany . |

Primary Examiner—David H. Corbin
Attorney, Agent, or Firm—Becker & Becker, Inc.

[57] ABSTRACT

A method of covering the sump of underground cavities which serve to store gaseous or liquid non-aqueous substances. The sump is covered with a layer of highly viscous crude oil which is at least 1 cm, and preferably 20 to 50 cm, thick. The crude oil contains not more than 7% hydrocarbons having up to 5 C atoms in a molecule thereof. The crude oil has a specific gravity of 20° C. of at most 1.2 g/cm$^3$.

5 Claims, 1 Drawing Figure

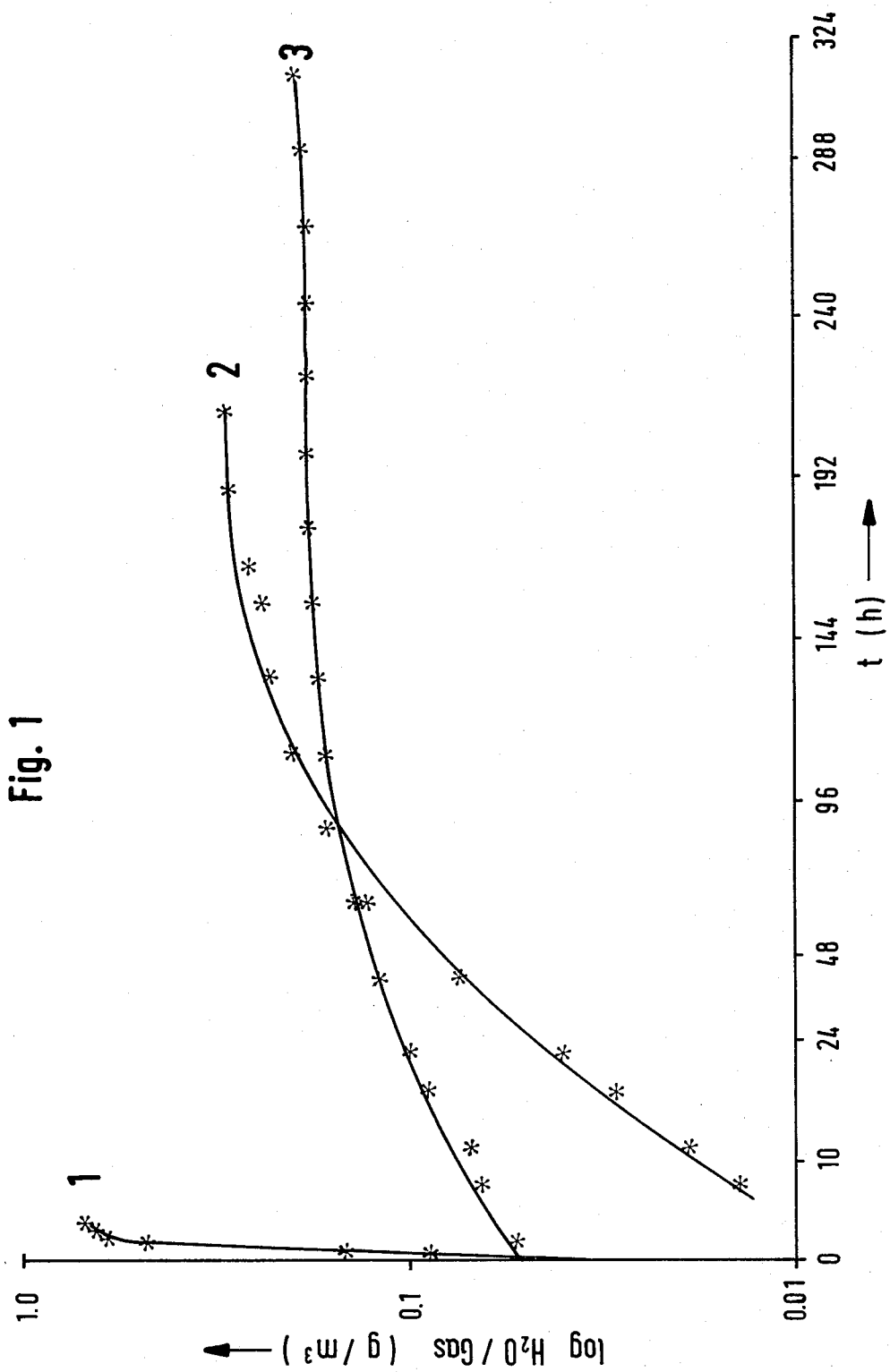

METHOD OF COVERING THE SUMP OF UNDERGROUND CAVITIES

The present invention relates to a method of covering the sump of underground caverns or cavities, particularly of underground cavities leached in salt domes, which serve to store gaseous or liquid non-aqueous substances.

It is known to form underground cavities in underground salt deposits of appropriate thickness by leaching, in that after a bore has been sunk in the salt deposit, fresh water is introduced and the brine formed is drawn off. Such artificially formed cavities, which are at depths of 500 to 2000 m below the surface of the earth, are already used to store gases and liquids, particularly combustible gases and mineral oil products.

In underground salt cavities which lie at the depths indicated, and which are only in communication with the surface of the earth through bores, it is not possible to completely remove the brine, formed during the formation of the underground cavity, before or during the filling with the medium to be stored; in other words, a so-called sump consisting of aqueous brine remains in any case at the bottom of the underground cavity.

Particularly when storing substances which are present completely or partially in the gaseous state in the underground cavity, i.e. when storing natural gas or liquid petroleum gas for example (preferably mixtures of propane and butane), the presence of the brine sump has the considerable disadvantage that moisture or water vapor passes over into the gas phase of the stored medium. Depending on the length of time which the stored medium remains in the underground cavity, and the pressures and temperatures prevailing therein—which depend, in particular, on the depth of the underground cavity—saturation with water vapor may occur in the gas phase.

Since the stored medium, after its withdrawal from storage, or before being passed to the consumer, particularly through pipelines under high pressure, must have a very low content of water vapor or a dew point preferably below 0° C., expensive drying installations are at present necessary at the site of the underground storages.

For years, numerous attempts have been made to cover the salt brine remaining in the underground cavity with a barrier layer which will prevent the diffusion of water vapor into the gas volume present above it. The demands on such a barrier layer are extremely high. It should not only be impermeable to water vapor, but should also have a high chemical long-term stability under the conditions prevailing in the underground cavity. Furthermore, it is required of this layer that it should have a so-called "self-healing" behavior when damaged, for example, by fragments of rock falling down from the roof of the underground cavity.

In order to prevent the absorption of water vapor by a gaseous stored medium, it has already been proposed to cover the aqueous brine sump with sealing or separating layers of, for example, bitumen (German Offenlegungsschrift No. 25 39 720), polyurethane synthetic resin (German Auslegeschrift No. 23 46 740), or by means of a polymerizing or non-polymerizing medium, or a mixture of both groups of substances (German Offenlegungsschrift No. 24 16 591).

To date, however, no results are known which have been achieved with these covering media.

Applicant's own experiments showed that the blocking effect on water vapor of a bitumen layer, even one having a thickness of 25 cm, is not sufficient.

When covering by means of polymer layers, under the conditions prevailing in the underground cavity, for example pressures of up to 300 bar and temperatures up to 75° C., it is to be expected that the chemical, but above all the hydrolytic, attacks on such a layer would be extremely great. It is therefore to be feared that the barrier layer would not withstand such an attack for a short time. In addition, the required self-healing action of such a polymer layer is not present.

It is an object of the present invention to prevent the passage of water vapor out of the sump into the stored medium, in other words, to achieve a covering of the sump which is practically impermeable to water and water vapor, with simultaneous insensitivity to mechanical damage.

This object, and other objects and advantages of the present invention, will appear more clearly from the following specification in connection with the accompanying drawing and Table, which show results of tests conducted utilizing the inventive covering method.

The method itself is characterized primarily in that a highly viscous crude oil is used for the covering, and contains not more than 7% hydrocarbons having up to 5 C atoms in the molecule, with the specific gravity of the crude oil amounting to at most 1.2 g/cm$^3$ at +20° C.; the thickness of the crude oil layer above the brine sump amounts to at least 1 cm, preferably 20 to 50 cm. The water content of the crude oil should be at most 0.3%.

The viscosity of the crude oil amounts to 40 to 150 Pas, preferably 50 to 150 Pas, at +20° C., and 0.2 to 1.2 Pas, preferably 0.3 to 1.0 Pas, at +80° C. The viscosity is given in the present legal unit, namely Pascal seconds (Pas). (1 Pas = 1 Ns/m$^2$ = 1 kg/ms).

Surprisingly, it has been found that such a crude oil has a number of properties which make it particularly suitable for solving the present problem:

The high viscosity is an advantage because, as a result, flow phenomena, particularly flows of gas which occur in the stored medium during filling or withdrawal, have practically no effect on the covering oil. On the other hand, the viscosity range was selected, as a result of experiments, so that the oil can also penetrate into cracks in the salt wall. As a result, a satisfactory marginal sealing is achieved in conjunction with the satisfactory wetting which the oil displays even on a wet salt wall.

The small proportion of lower hydrocarbons in the oil ensures that an exchange of components between the oil and the stored medium practically does not take place. A crude oil of the given composition is designated as a (geologically) old oil, from which the easily volatile components have already separated since its formation in the natural deposits, and in which certain aging phenomena have taken place. Applicant's own measurements have shown that even after long contact with gaseous or highly volatile hydrocarbons, for example, with methane up to butane, such a crude oil neither absorbs parts of these hydrocarbons, nor surrenders components to these, at least not in such quantities that the composition of the stored medium is altered to a measurable extent.

The specific gravity of the crude oil is lower, by a sufficiently great amount, than that of the saturated salt solution which is to be covered, so as to float on the brine in all circumstances.

In order to inhibit the diffusion of water or water vapor through the oil covering, which diffusion is already slight because of the high viscosity of the oil, to the greatest extent, the use of a minimum thickness of the crude oil layer has proved necessary. The layer thickness to be used depends, in particular, on the temperature in the lower part of the underground cavity, which in turn is determined by the depth or the geothermal depth position of the underground cavity.

In order to determine the effectiveness of the covering layer, experiments were carried out in a high-pressure apparatus which made it possible to simulate the conditions in an underground cavity with regard to pressure, temperature, and the wetting of the oil on the salt wall.

Results of these experiments, which were carried out at a pressure of 100 bar and a test apparatus temperature of 50° C., are reproduced in FIG. 1 and Table 1.

The curve 1 in FIG. 1 shows, by way of example, the water-vapor absorption—as a function of time—of a natural gas which was introduced, with a dew point of −20° C., into the storage chamber of the experimental apparatus, in which was located a brine sump of saturated salt solution.

From curve 1, it can be seen that without covering the brine sump, the gas was already saturated with water vapor after less than two hours. The curves 2 and 3 show the results with oil covering layers 1 cm and 25 cm high. It can be seen that in the course of a long time a certain increase in the water-vapor content takes place which asymtotically approaches an end value, but which remains considerably below the saturation value, and which is considerably lower with a covering of 25 cm than with a covering of only 1 cm.

The curve illustration of FIG. 1 corresponds to the numerical values of Table 1 in which, apart from the water absorption of the gas ($H_2O$/gas in $g/m^3$), also the associated dew point ($T_P$) is given, in °C., as a function of time. Whereas the time scale for the values corresponding to curve 1 is given in minutes, the time scale for the measurements of the brine covered with oil—corresponding to curves 2 and 3—is given in hours.

The measurements of water-vapor content and dew point began, in the last two series of measurements, two hours after the filling of the experimental apparatus; gases with different contents of water vapor were used because of the experiment: In the experiment with a covering of 10 mm of oil, the water-vapor content of the gas was originally 0.01 $g/m^3$, whereas in the experiment with a 250 mm oil covering, it was 0.053 $g/m^3$.

In the evaluation or transfer of the results of the experiments represented above to the conditions prevailing in a commercially used underground storage cavity, however, the following is of decisive importance:

The ratio of brine surface to the volume stored above is disproportionately greater in an experimental apparatus than in underground cavity storage means. The measured values obtained or given therefore do not apply directly to the latter, but can be used to calculate the diffusion of water vapor per unit of area from the brine which is uncovered or is covered with oil layers of different thickness. With pressures of 100 bar, the following diffusion rates are obtained:

| Uncovered brine | 9.77 $g/m^2 \cdot h$ |
| 10 mm covering of oil | 0.0464 $g/m^2 \cdot h$ |
| 250 mm covering of oil | 0.0091 $g/m^2 \cdot h$ |

In this connection, the diffusion rates have been calculated from the water-vapor content of the gas, with the water-vapor content after one hour being used as a basis for the uncovered brine, and the water-vapor content after 200 hours being used for the brine covered with oil.

The above figures show that the water-vapor diffusion through a 250 mm thick covering of oil amounts to less than a thousandth of that without a covering.

For an underground storage cavity of the usual dimensions, i.e. with a cavity volume of about 250,000 to 350,000 $m^3$ and a brine surface of, for example, 900 to 1,100 $m^2$, the dew point of a gas stored at about 70 bar would alter as follows, for example, after the gas had remained in storage for one year:

| Without brine covering | from −8° C. to +38° C. |
| with 10 mm covering of oil | from −8° C. to −6° C. |
| with 250 mm covering of oil | from −8° C. to −7° C. |

The alterations in the dew point or the moisture absorption of the gas with a brine covered with oil according to the invention are obviously so slight that with an underground storage cavity thus prepared or treated, the expensive and energy-consuming installation previously necessary for drying the gas withdrawn from storage can be omitted.

Furthermore, it has been found that according to the invention, a covering layer of the crude oil described has an excellent "self-healing" action. With a layer thickness of 250 mm, for example, even large fragments of rock, which fall from the roof of the underground cavity and penetrate through the covering layer, have no disadvantageous effect on the blocking behavior of the layer, which closes within a few minutes. Brine, which might reach the surface of the covering layer in such an event, sinks again within a short time as a result of its greater specific gravity, as appropriate experiments have shown.

The present invention is, of course, in no way restricted to the specific disclosure of the specification, drawing, and table, but also encompasses any modifications within the scope of the appended claims.

TABLE 1

Dew points (°C.), at 100 bar and at 50° C., and water contents ($g/m^3$ gas in the normal state) over covered and uncovered brine.

| Curve 1: Uncovered brine | | Curve 2: 10 mm oil covering | | | Curve 3: 250 mm oil covering | | |
| --- | --- | --- | --- | --- | --- | --- | --- |
| Time (min) | $T_p$ (°C.) | $H_2O$/gas ($g/m^3$) | Time (h) | $T_p$ (°C.) | $H_2O$/gas ($g/m^3$) | Time (h) | $T_p$ (°C.) | $H_2O$/gas ($g/m^3$) |
| 0 | −27.8 | 0.012 | 2 | −30 | 0.01 | 2 | −8.4 | 0.053 |
| 10 | −2.0 | 0.09 | 4 | −30 | 0.01 | 4 | −7.4 | 0.06 |
| 40 | +7.0 | 0.146 | 8 | −25 | 0.014 | 8 | −5.0 | 0.066 |
| 60 | +27.0 | 0.488 | 12 | −21 | 0.019 | 12 | −4.50 | 0.07 |

TABLE 1-continued

Dew points (°C.), at 100 bar and at 50° C., and water contents (g/m³ gas in the normal state) over covered and uncovered brine.

| Curve 1: Uncovered brine | | | Curve 2: 10 mm oil covering | | | Curve 3: 250 mm oil covering | | |
| --- | --- | --- | --- | --- | --- | --- | --- | --- |
| Time (min) | $T_p$ (°C.) | H₂O/gas (g/m³) | Time (h) | $T_p$ (°C.) | H₂O/gas (g/m³) | Time (h) | $T_p$ (°C.) | H₂O/gas (g/m³) |
| 80 | +32.0 | 0.62 | 18 | −16.5 | 0.029 | 18 | −1.0 | 0.09 |
| 100 | +33 | 0.66 | 24 | −12 | 0.04 | 24 | +1.0 | 0.1 |
| 120 | +34 | 0.71 | 48 | −3 | 0.075 | 48 | +4.5 | 0.122 |
| | | | 72 | +5 | 0.13 | 72 | +6.9 | 0.14 |
| | | | 96 | +9.5 | 0.165 | 96 | +8.5 | 0.16 |
| | | | 120 | +12 | 0.2 | 120 | +9.0 | 0.165 |
| | | | 144 | +14 | 0.23 | 144 | +9.3 | 0.17 |
| | | | 168 | +15 | 0.24 | 168 | +10 | 0.18 |
| | | | 192 | +17 | 0.26 | 192 | +9.9 | 0.18 |
| | | | 216 | +18 | 0.29 | 216 | +10.1 | 0.181 |
| | | | 240 | +19 | 0.3 | 240 | +10.6 | 0.182 |
| | | | | | | 264 | +10.5 | 0.182 |
| | | | | | | 288 | +10.3 | 0.182 |
| | | | | | | 312 | +11 | 0.19 |
| | | | | | | 336 | +12 | 0.2 |

What we claim is:

1. A method of producing an underground cavity with a sump in a salt dome to store gaseous or liquid non-aqueous substances, said method comprising in combination the steps of introducing water into the salt dome to form brine, removing as much brine as possible leaving the sump therein, and covering said sump with a layer of highly viscous crude oil which is at least 1 cm thick below the stored substances to form a separation layer between the stored substances and the brine sump to prevent any transition of water respectively water vapor from the sump into the stored substances, said crude oil containing at most 7% hydrocarbons having up to 5 C-atoms in a molecule thereof, said crude oil being heavier than the stored substances though lighter than the brine sump and having a specific gravity at 20° C. of at most 1.2 g/cm³.

2. A method in combination according to claim 1, which includes the step of covering said sump with a layer of crude oil which is 20 to 50 cm thick.

3. A method in combination according to claim 1, which includes the step of using crude oil having a viscosity of 40 to 150 Pas at 20° C., and 0.2 to 1.2 Pas at 80° C.

4. A method in combination according to claim 3, which includes the step of using crude oil having a viscosity of 50 to 150 Pas at 20° C., and 0.3 to 1.0 Pas at 80° C.

5. A method in combination according to claim 1, which includes the step of using crude oil having a maximum water content of 0.3%.

* * * * *